INVENTORS:
FREDERICK WILLIAM BERTRAM PORTER
ROY PURDY NORTHCOTT

ATTORNEYS

United States Patent Office 2,769,687
Patented Nov. 6, 1956

2,769,687

PROCESS FOR THE RECOVERY OF VANADIUM FROM CARBON- AND VANADIUM-CONTAMINATED CATALYSTS

Frederick William Bertram Porter and Roy Purdy Northcott, Sunbury-on-Thames, England, assignors to The British Petroleum Company Limited Application December 24, 1952, Serial No. 327,802

Claims priority, application Great Britain January 1, 1952

1 Claim. (Cl. 23—140)

This invention relates to the recovery of vanadium from carbon- and vanadium-contaminated catalyst and contact materials and particularly from such catalysts and contact materials as have been used in the processing of petroleum products.

In the specification of the co-pending U. S. application Serial No. 263,956, filed December 28, 1951, by F. W. B. Porter and J. W. Hyde, there is described a process by which vanadium may be removed from petroleum products by passage over bauxite at elevated temperature and pressure In due course, the bauxite becomes contaminated with both carbon and vanadium and the invention is particularly applicable to the recovery of vanadium from such bauxite. It is also an object of the invention to recover the vanadium in a substantially pure form.

According to the invention, a carbon- and vanadium-contaminated catalyst or contact material is heated in an oxygen-containing gas at a temperature sufficient to burn off the carbon but insufficient to volatilise the vanadium, whereupon the temperature is increased so as to volatilise the vanadium in the form of its oxide which may be recovered by cooling.

The invention is advantageously carried into effect by first heating the carbon- and vanadium-contaminated catalyst or contact material in a mixture of inert gas and air so as to burn off the carbon and thereafter heating the vanadium-contaminated catalyst or contact material in air alone so as to volatilise the vanadium in the form of its oxide.

The first heat treatment may advantageously be carried out in the presence of inert gas containing 5% of air and at a temperature of approximately 1000° F. The oxygen content of the gas mixture should be restricted so as to prevent a temperature being reached at which the vanadium would be volatilised.

The second heat treatment may advantageously be carried out in the presence of air alone at a temperature of approxiamtely 1300° F. whereby the vanadium is volatilised in the form of its oxide which may be recovered in substantially pure form by cooling the exit gases.

Figure 1:
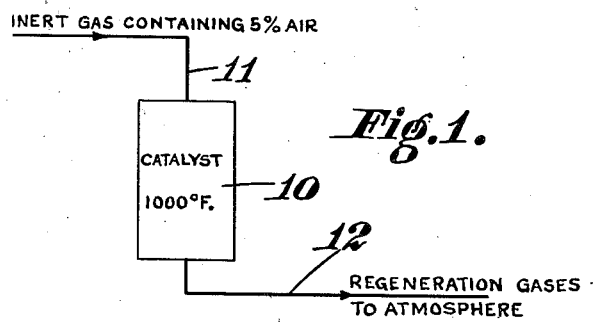
Figure 2:
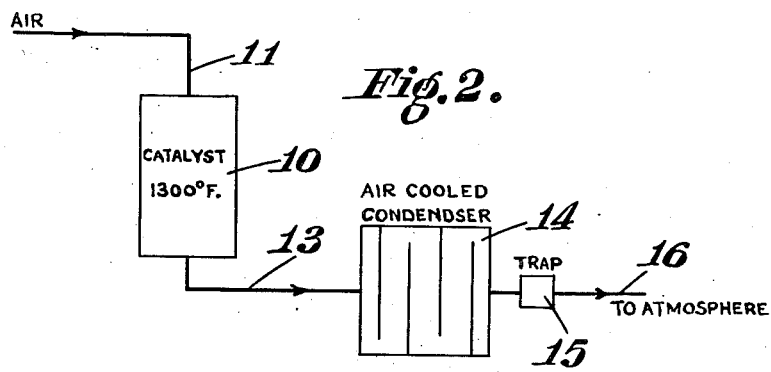

One embodiment of the invention is diagrammatically illustrated in the accompanying drawings, wherein:

Figure 1 illustrates the first stage, and
Figure 2 illustrates the second stage.

Referring first to Figure 1, the catalyst or contact material in the chamber 10 which has become contaminated with carbon and vanadium is first heated in a current of an air-containing inert gas introduced via line 11, to a temperature sufficient to burn off the carbon but insufficient to volatilise the vanadium, the regeneration gases passing to the atmosphere via line 12.

The catalyst or contact material is then heated in a current of air introduced via line 11 to a temperature sufficient to volatilise the vanadium in the form of its oxide, the exit gases from the chamber 10 passing via line 13 to an air-cooled condenser 14, wherein the vanadium oxide is recovered in susbtantially pure form, and thence via trap 15 and line 16 to the atmosphere.

The invention will now be described with reference to the following example.

Example 1000 g. of buaxite used in a guard chamber to protect the cobalt molybdate catalyst in the hydrofining of crude oil, according to the co-pending U. S. patent application Serial No. 276,256, filed March 13, 1952, by F. W. B. Porter and J S. Isitt, was found to contain 12 g. of vanadium after 1000 hours use This bauxite was regenerated at 1000° F. in a stream of air and nitrogen to remove the carbonaceous deposits after which it was treated at 1300° F. with pure air at a rate of 100 s. c. f./hr. In 50 hours the vanadium was substantially removed from the bauxite and was recovered as vanadium pentoxide from the exit gases on cooling to atmospheric temperature.

The method of recovering vanadium according to the present invention may be applied to a moving bed catalytic unit, in which case the air used in the second stage passes countercurrent to the regenerated catalyst.

We claim:

A process for regenerating bauxite contaminated with carbon and vanadium to restore its activity for use in the removal of vanadium from petroleum products and to recover the vanadium contaminant in the form of substantially pure vanadium oxide as a product which comprises heating the contaminated bauxite in a mixture of inert gas and about 5% of air at a temperature of about 1000° F., said temperature being sufficient to burn off the carbon but insufficient to volatilize the vanadium, thereafter heating the de-carbonized bauxite in the presence of air alone at a temperature of about 1300° F. to volatilize the vanadium in the form of its oxide and obtain re-activated bauxite as a desired product, and cooling the resulting vanadium oxide-containing air out of contact with the re-activated bauxite to recover the vanadium oxide in a substantially pure form as an additional desired product.

References Cited in the file of this patent

UNITED STATES PATENTS

| | | |
|---|---|---|
| 2,162,893 | Kuhl | June 20, 1939 |
| 2,198,195 | Groll | Apr. 23, 1940 |
| 2,226,548 | Burk | Dec. 31, 1940 |
| 2,570,067 | Myers | Oct. 2, 1951 |
| 2,587,286 | Brundin | Feb. 26, 1952 |